T. WINANS.
CARRIAGE-ROOF.

No. 188,325.  Patented March 13, 1877.

Attest:

Inventor

UNITED STATES PATENT OFFICE.

THOMAS WINANS, OF BALTIMORE, MARYLAND.

IMPROVEMENT IN CARRIAGE-ROOFS.

Specification forming part of Letters Patent No. 188,325, dated March 13, 1877; application filed January 29, 1877.

*To all whom it may concern:*

Be it known that I, THOMAS WINANS, of Baltimore, Maryland, have invented certain new and useful Improvements in Vehicles, of which the following is a specification:

My invention relates to what are known as closed or covered carriages, used for the conveyance of persons. Such carriages are naturally used in preference to what are termed open carriages during the winter season or during the prevalence of chilly or cold weather, for from such a carriage the cold may, to a considerable extent, be excluded. But the exclusion of the cold works equally the exclusion of the sun—a deprivation of no small moment, especially to invalids, or to those whose state of health or physical condition virtually confines them to the carriage as a means of exercise.

The object of my invention is to remove this drawback to the use of covered carriages; and to this end I have devised a close or covered carriage, whose roof, or so much thereof as may be necessary for the purpose, is made of a transparent material, such as glass, which, while excluding the cold, will admit the sun's rays to the interior of the carriage.

This improvement is illustrated in the accompanying drawing, in which I have represented a few of the many ways in which my invention may be carried into effect.

Figure 1:
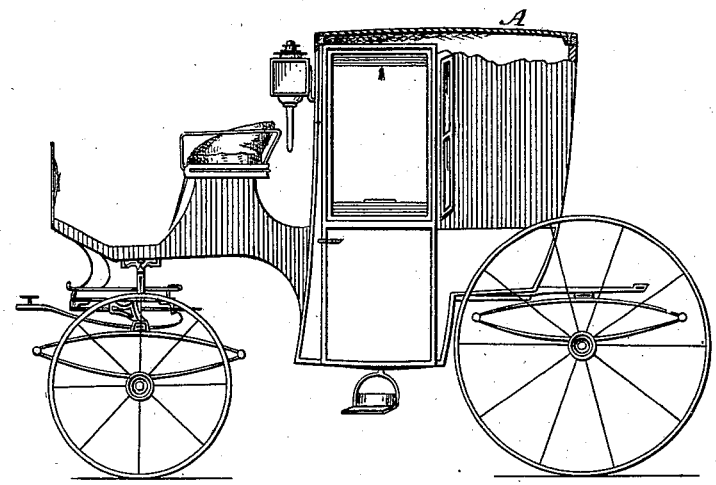

Figure 1 is a side elevation of a close or covered carriage made in accordance with my invention, the side of the carriage being partly broken away, in order to more fully show the roof.

The roof A is in this case made wholly of glass, cast or molded in the usual shape of a carriage-top. A roof of this kind has all the advantages above noted. It also has a polish quite equal to, and much more durable than, ordinary varnished roofs. It may be secured to the sides of the carriage in a variety of ways, two of which I represent.

Figure 2:
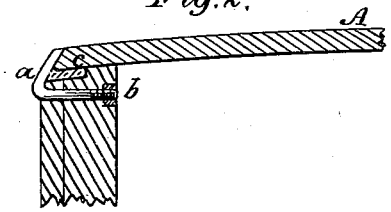

In Fig. 2, which is a vertical section through the roof on an enlarged scale, the roof is held to the sides by hooks $a$, that catch over the beveled edges of the roof, and are drawn up tight by means of nuts $b$, which are screwed onto their screw-threaded shanks. Packing $c$, of rubber or its equivalent, may be interposed between the sides and glass roof to prevent any danger of fracture of the latter.

Figure 3:
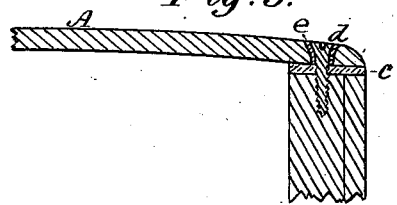

In Fig. 3, which is a section similar to that in Fig. 2, the top is held to the sides by screws $d$, which pass down through the top into the sides. The apertures in the top, through which the screws pass, may be lined with rubber sleeves $e$; and, as in Fig. 2, rubber packings $c$ are interposed between the top and the sides.

Figure 4:
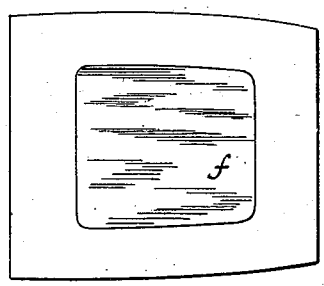

Fig. 4 is a plan of a carriage-roof, in which the central part $f$ only is made of glass.

Figure 5:
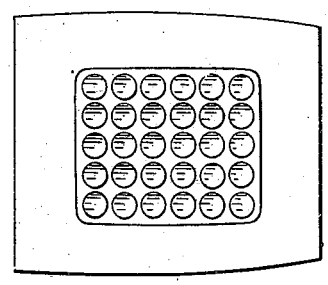

This glass portion, instead of being in one sheet or piece, as shown in Fig. 4, may be made of glass set in a metal or other frame, after the fashion of a vault-light, as indicated in Fig. 5; or the glass may be in panes, properly secured in the top.

Figure 6:
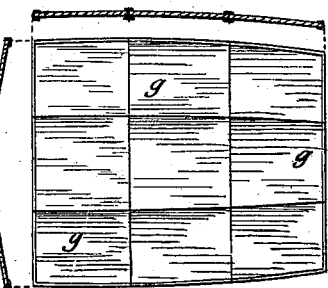

The construction last suggested is shown in Fig. 6, which, however, represents in plan a full carriage-roof, made wholly of such panes, and having the double convex configuration of ordinary carriage-roofs, as indicated by the sections at the top and side of the plan.

The panes $g$ in this case are, or may be, secured in place by means of what are termed "cames"—that is, metal strips of H form in cross-section, commonly used to hold the glass of stained or ornamental glass windows.

It is obvious that the transparent roof may be provided with curtains, that can be drawn or not, as occasion may demand.

The above will suffice to indicate some of the ways in which the object I have in view can be attained. Without limiting myself, however, to the special means herein described for carrying my said invention into effect,

What I claim is—

A covered carriage whose roof is composed, in whole or in part, of a transparent material, substantially as set forth.

In testimony that I claim the foregoing as my own I affix my signature in presence of two witnesses.

THOMAS WINANS.

Witnesses:
 ROSS R. WINANS,
 JAS. HENDERSON.